United States Patent [19]

Becker

[11] 3,753,767

[45] Aug. 21, 1973

[54] METHOD OF SUGAR-COATING TABLETS

[75] Inventor: Wallace E. Becker, Franksville, Wis.

[73] Assignee: Colgate-Palmolive Company, New York, N.Y.

[22] Filed: Aug. 2, 1971

[21] Appl. No.: 168,367

[52] U.S. Cl. ............... 117/100 A, 99/135, 99/166, 117/100 B, 117/165, 424/34
[51] Int. Cl. .............................................. B44d 1/08
[58] Field of Search .................. 117/100 A, 100 B, 117/165; 424/35; 99/135, 166

[56] References Cited
UNITED STATES PATENTS

| | | | |
|---|---|---|---|
| 3,480,468 | 11/1969 | Carletti et al. ............... | 117/100 A X |
| 278,780 | 6/1883 | Daniels ........................... | 117/100 A |
| 3,456,050 | 7/1969 | Rieckmann et al. ......... | 117/100 A X |
| 3,573,966 | 4/1971 | Hostetler ........................ | 117/100 A |
| 3,361,631 | 1/1968 | Weinstein ..................... | 117/105.1 X |
| 3,371,015 | 2/1968 | Sjogren et al. ................ | 117/100 A |
| 3,420,931 | 1/1969 | Daum et al. .................. | 117/100 A X |

Primary Examiner—Murray Katz
Assistant Examiner—Dennis C. Konopacki
Attorney—T. F. Kryshak et al.

[57] ABSTRACT

Tablets are sugar-coated with an aqueous sugar-coating solution which comprises about 5 percent to 30 percent by weight of calcium sulfate dihydrate. The coating solution is adaptable to automatic application which greatly reduces the time normally required for sugar-coating tablets. The tablets obtained possess good elastic and mechanical strength.

4 Claims, No Drawings

METHOD OF SUGAR-COATING TABLETS

BACKGROUND OF THE INVENTION

The sugar-coating of tablets to make them more palatable or pleasant in appearance has been done for many years. Tablet cores are usually punched and have sharp edges and corners. To obtain a good, durable, smooth sugar-coating, it is essential that all sharp edges and corners of the tablet cores be covered or rounded before the finishing syrup coating is applied. In the past this has been done by first applying an adhesive coating to the tablet cores and then adding a subcoating powder which adheres to the sharp edges and rounds off the tablets. The adhesive coating is generally comprised of gelatin, acacia, sugar and water, and the subcoating powder is usually a blend of insoluble powders, adhesives and lubricants such as calcium carbonate, talc, kaolin, sugar, acacia and lactose. The application of the subcoating powder using conventional techniques requires a great degree of skill and it is actually the most crucial phase of the sugar-coating operation. A good subcoating is essential in order to obtain a satisfactorily smooth final coating. The subcoating application using conventional techniques may take as long as three working days to complete because it requires the application of a large number of individual layers of subcoating syrup.

In United States Pat. No. 3,361,631 a method is disclosed of automatically sugar-coating tablets with a syrup which is free of any insoluble powders, adhesives or lubricants. In United States Pat. No. 3,420,931 a method is disclosed for coating tablets with a sugar-coating solution which contains a vinyl polymer. The vinyl polymer is added to give the tablet coating elastic and mechanical strength which is not normally obtainable when sugar coatings are used which do not contain adhesives or lubricants. A good summary of the various patented and unpatented methods for preparing sugar-coated tablets can be found in United States Pat. No. 3,456,050.

It is an object of the present invention to disclose a method of automatically applying a superior sugar coat to tablets without including in said sugar coating any adhesives or synthetic polymeric material.

It is a further object of the present invention to disclose a method of sugar-coating tablets which is much faster and efficient than previously known methods.

It is a still further object to disclose a tablet having a sugar coating which does not contain adhesives or synthetic polymeric material but which still possesses desirable elastic and mechanical strength.

DETAILED DESCRIPTION OF THE INVENTION

The method of the present invention comprises coating a tablet core with an aqueous sugar syrup comprising from about 45 percent to 65 percent by weight of sugar and about 5 percent to 30 percent by weight of calcium sulfate dihydrate or, as it is also known, terra alba. In the preferred practice of the method, the tablet cores to be sugar-coated are placed in a side-vented tablet-coating pan and the novel sugar-coating solution is hydraulically sprayed directly upon the tablet cores, preferably at a nozzle pressure of about 800 to 1,500 lbs. per square inch. When a predetermined amount of syrup has been sprayed on the tablet cores, the tablet cores are rolled for 2 to 5 minutes to uniformly distribute the sugar coating on all surfaces of the tablet cores. The thus coated tablet cores are then dried under air pressure with heating. If desired, minor amounts of coloring materials and waxes may be added to the coated tablets.

A normal coating cycle comprises spraying of the syrup upon the tablet cores for about 10 seconds, rolling the tablet cores for about 2 ½ minutes and drying the coated tablet cores for another 2 ½ minutes. The total cycle time is about 5 minutes and may be repeated as often as necessary to build up the desired amount of sugar coating. It has been found that the described method makes it possible to build up sugar coatings on tablet cores which increase the weight of the tablet by 100 percent in about 4 to 5 hours by repeating the coating cycle 50 to 60 times. Obviously, a weight increase of less than 100 percent can be accomplished in a shorter period of time using a lesser number of cycles.

The sugar-coating solution will generally contain from about 45 percent to about 65 percent by weight of sugar and about 5 percent to about 30 percent by weight of calcium sulfate dihydrate. On a percent solids basis the solution will generally contain about 60 percent to about 95 percent of sucrose and about 5 percent to about 40 percent of the calcium sulfate dihydrate. When the calcium sulfate dihydrate concentration is much less than 5 percent by weight, the number of major and minor tablet defects which occur, such as chipping, is considered unacceptable. On the other hand, when the percentage of calcium sulfate dihydrate is much more than 30 percent by weight, the tablets may have an outer sugar-coated surface which has a texture which is rougher than desired. In contrast to the insoluble powders which are generally used, calcium sulfate dihydrate has an affinity for water and is slightly soluble in water which results in the unique advantages of the present method. The addition of the calcium sulfate dihydrate has been found to not only affect the elastic and mechanical strength of the tablets, but also the length of time required to increase the weight of the tablet. For example, it has been found that when calcium sulfate dihydrate is eliminated from the formula, the time required to increase the weight of the tablet by 100 percent is increased approximately 25 percent.

The tablet-coating pan to be used is preferably a side-vented tablet-coating pan, such as that manufactured under the name "Accela Cota," and is preferably employed without a hood. The pan is provided with a blower and is connected to an exhaust system. Preferably the pan is not equipped with baffles or anti-slide bars.

The spraying equipment used must be capable of spraying the novel sugar-coating syrup at a nozzle pressure of 800 to 1,500 lbs. per square inch through a fine nozzle orifice. The Grayco Hydra Spray System Model 950–886 with a 0.021 inch spray tip may be employed. As previously stated, the spray cycle is preferably about ten seconds.

It is generally preferred that the sugar-coating syrup be warmed to 120°–140° F. for use in the spraying apparatus. As previously stated, the solution does not require additives such as adhesives and will normally contain only coloring materials. Preservatives can be added if the solutions are to be stored for extended periods of time.

The drying cycle of 2 and ½ minutes is made possible by the use of an external heat source such as a heat gun having a 500° F. maximum temperature. In the preferred practice, the heat gun is mounted about 12 inches from the side of the pan. Obviously, equivalent heating systems can also be used.

The complete coating cycle comprised of the spraying, rolling and drying steps may be automatically regulated by use of commercially available timing mechanisms.

The method of the present invention lends itself to automation because it eliminates much of the operator handling which was necessary with traditional sugar-coating methods. For example, in the past it was often necessary after each addition of insoluble powders for the operator to hand-roll the tablets in order to get an even distribution of a coating material.

The sugar-coating method of the present invention is particularly well-adapted for use in coating pharmaceutical tablets and the like. However, it is also useful in the coating of confectionaries such as chewing gum. The described method of sugar-coating also provides an advantage over previously patented methods in that it employs only naturally occurring substances and therefore can be used in countries such as west Germany which prohibit the use of sugar-coating syrups which contain synthetic polymeric materials.

The practice of the invention is further illustrated by the following example:

EXAMPLE

An Accela Cota No. 24 side-vented tablet-coating pan is loaded with 5.25 kg., or approximately 50,000, of 9/32 in. lactose tablet cores. The reservoir of a Grayco tablet-coater hydraulic spray system is charged with a syrup containing 17.84 percent by weight of calcium sulfate dihydrate, 54.08 percent by weight of sucrose and 28.88 percent by weight of water. The nozzle of the spray gun is equipped with a 0.021 in. spray tip and is positioned eight to ten inches from the tablets. The spray system is connected to an air pressure source providing a theoretical fluid pressure at the nozzle orifice of about 1,120 lbs. per square inch. A Dayton 500° F. maximum heat gun is positioned 12 inches from the side of the pan. The pan is then rotated at 30 r.p.m., the pan vent opened and the exhaust system turned on. The hydraulic spray system is activated for 9 seconds with the pan rotating. In 9 seconds approximately 90 ml. of coating syrup is applied to the tablets. The tablets are then rolled with the pan blower turned off but the central exhaust system turned on for 2 minutes 25.5 seconds. The heat gun is then turned on at maximum temperature and the blower turned on for 2 minutes 25.5 seconds. The pan is permitted to revolve at 30 r.p.m. during the entire spraying, rolling and drying cycles. The complete coating cycle, which consists of the spraying, rolling and drying cycles, is repeated 55 times. At that time a colored subcoating syrup containing ten parts of the original subcoating syrup and one part of Opalux AS 3162 Green by volume is substituted for the original sugar-coating syrup. The spraying, rolling and drying cycles are repeated five more times using the new colored subcoating syrup. The tablet cores are then removed from the pan and found to be uniformly smooth and of desired shape. The total lapsed time for the described coating operation was about five hours. The tablets were weighed and found to have increased in weight by 90 percent as compared to the tablet cores. The subcoated tablets were then color-coated and polished in the conventional manner. The finished tablets were then tested for elastic and mechanical strength and found to be equivalent to tablets which have been prepared by conventional coating techniques which had required three to four working days for completion.

Tablets coated by the practice of the present invention have been found to possess all of the desirable characteristics of tablets prepared by known methods which employ adhesives and lubricants.

The method of the present invention may be employed with obvious modifications to prepare sugar-coated confectionaries as well as pharmaceutical tablets.

I claim:

1. The method of sugar-coating tablet cores without employing adhesives or polymeric materials which comprises the steps of applying an aqueous sugar syrup containing a sugar-coating consisting essentially of 45 percent to 65 percent by weight of sucrose and 5 percent to 30 percent by weight of calcium sulfate dihydrate directly to untreated tablet cores by hydraulically spraying the syrup onto said cores at a nozzle pressure of about 800 to 1,500 lbs. per square inch, rolling the spray-coated cores for 2 to 5 minutes, drying the spray-coated cores with the aid of heat and then repeating the complete spraying, rolling and drying cycles as often as is necessary to have the tablets reach a predetermined finished weight.

2. The method of claim 1 in which the method is carried out in a side-vented tablet-coating pan.

3. A sugar-coated tablet consisting of a tablet core and an outer sugar coating, said coating consisting of about 5 percent to about 40 percent of calcium sulfate dihydrate and 60 percent to 95 percent of sucrose on a percent solids basis.

4. A sugar-coated tablet comprised of an inner core and an outer sugar coating, said sugar coating consisting essentially of a uniform mixture of 60 percent to 95 percent of sucrose on a percent solids basis, about 5 percent to about 40 percent of calcium sulfate dihydrate on a percent solids basis, and minor amounts of coloring materials and waxes.

* * * * *